United States Patent [19]

Yamamoto et al.

[11] Patent Number: 4,593,785
[45] Date of Patent: Jun. 10, 1986

[54] POWER UNIT FOR A VEHICLE

[75] Inventors: Sadashi Yamamoto; Takeo Ishihara, both of Saitama, Japan

[73] Assignee: Honda Giken Kogyo Kabushiki Kaisha, Tokyo, Japan

[21] Appl. No.: 595,293

[22] Filed: Mar. 30, 1984

[30] Foreign Application Priority Data

Apr. 4, 1983 [JP] Japan .................................. 58-59045

[51] Int. Cl.$^4$ .............................................. B62M 7/12
[52] U.S. Cl. ..................................... 180/291; 180/210; 123/195 A
[58] Field of Search .................... 123/195 A; 180/291, 180/297, 210, 292; 74/15.63; 192/103 A, 103 B, 20

[56] References Cited

U.S. PATENT DOCUMENTS

| 1,880,270 | 10/1932 | Noble | 180/291 |
| 1,979,075 | 10/1934 | Meyer | 180/291 |
| 3,073,291 | 1/1963 | Leonard | 123/195 A |
| 4,300,649 | 11/1981 | Sakata | 180/291 |

Primary Examiner—Henry Bennett
Attorney, Agent, or Firm—Lyon & Lyon

[57] ABSTRACT

A power unit particularly adapted to a three-wheel vehicle which employs a single cylinder, two-stroke engine driving a centrifugal clutch, a gear train and a drive shaft to one wheel. The drive shaft is rotatably mounted in a portion of the engine housing and is also rotatably mounted within a coaxial bore through one end of the crankshaft. A spaced rear wheel on the other side of the engine is freewheeling. To accommodate the asymmetric power to one rear wheel, the drive shaft, the crankshaft and the engine cylinder are canted from alignment with the centerline of the vehicle to provide the appropriate toe-in.

7 Claims, 8 Drawing Figures

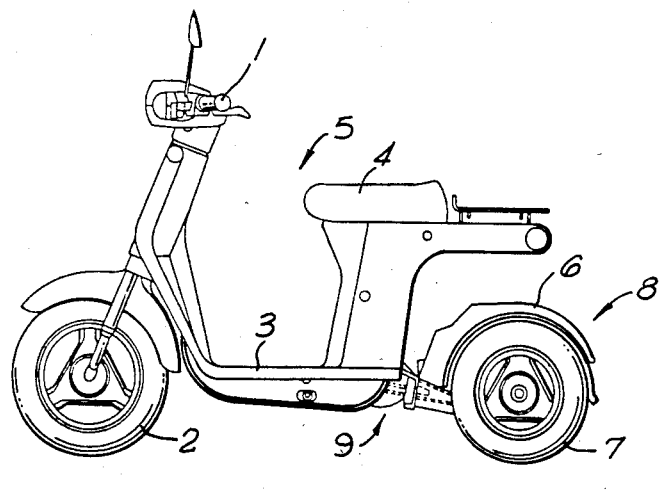
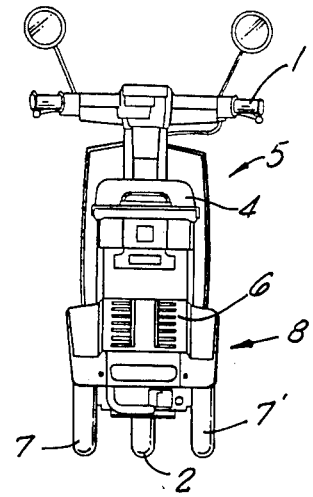
FIG. 1.
FIG. 2.
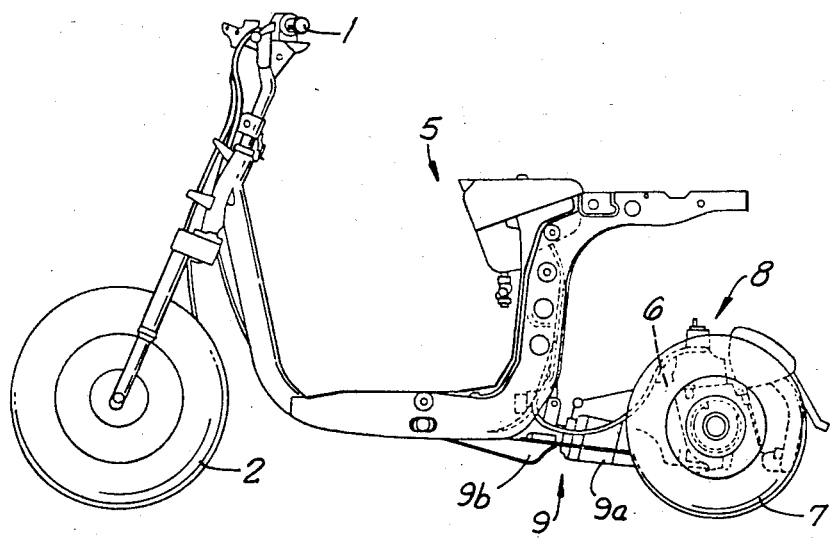
FIG. 3.
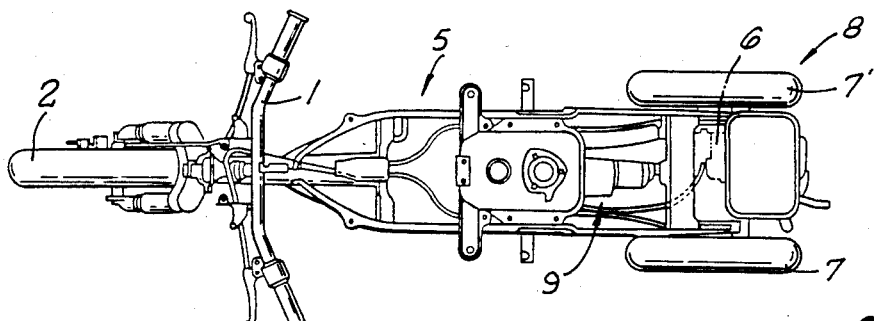
FIG. 4.

POWER UNIT FOR A VEHICLE

BACKGROUND OF THE INVENTION

The field of the present invention is vehicle drive trains.

Three-wheel vehicles have been developed which have a front body frame associated with a steerable front wheel and a rear body frame associated with two spaced wheels. The front and rear body frames are joined by means of a swing joint mechanism such that the front body frame is able to lean or roll with turning. In certain three-wheel configurations employing such an articulated frame, it is advantageous to retain the rear wheels relatively close to one another. However, location of the power unit on such vehicles may be between the rear wheels. In such configurations, the rear wheels must be more broadly spaced than desired to accommodate the power unit.

SUMMARY OF THE INVENTION

The present invention is directed to a power unit for a vehicle wherein the width of the power unit is maintained at a minimum. As a result, the present invention is of particular applicability to three-wheel, articulated vehicles where the rear wheels are to be relatively close together.

To accomplish the foregoing, a transverse crankshaft includes a coaxial bore in one end. A drive shaft is rotatably mounted to the engine housing and to the crankshaft within the bore. Intermediate drive train between the crankshaft and the drive shaft may be coupled between the two with certain elements such as the clutch being coaxially arranged and supported by one of the two shafts. Through this arrangement, power unit width may be decreased to accommodate smaller wheel base configurations.

In further aspects of the present invention, the drive train may be arranged to drive one of the rear wheels of such a three-wheel vehicle. In this case, an axle shaft is provided for the freewheeling rear wheel. To allow the vehicle to be generally driven along its centerline, the asymmetric driving power may be accommodated through toe-in of the driven wheel. Consequently, the drive shaft and the centerline of the engine cylinder may be canted forward from perpendicular to the centerline of the vehicle. The free-wheeling axle shaft may be perpendicular to the centerline of the vehicle in this instance. Both the drive shaft and the axle shaft may be supported in the engine housing in a modular power unit arrangement.

Accordingly, it is an object of the present invention to provide an improved power unit for small vehicles. Other and further objects and advantages will appear hereinafter.

BRIEF DESCRIPTION OF THE DRAWINGS

FIG. 1 is a side elevation of a vehicle employing the present invention.

FIG. 2 is a rear view of a vehicle employing the present invention.

FIG. 3 is a side elevation of a vehicle employing the present invention illustrating in greater detail the power unit layout.

FIG. 4 is a plan view of a vehicle employing the present invention with portions of the body removed for clarity.

DETAILED DESCRIPTION OF THE PREFERRED EMBODIMENT

Figure 5:
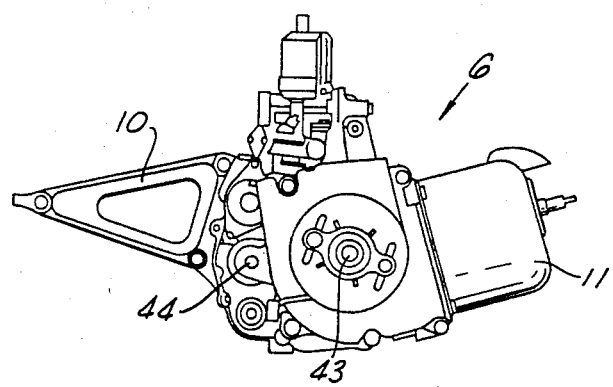
FIG. 5 is a side elevation of a power unit of the present invention.
Figure 6:
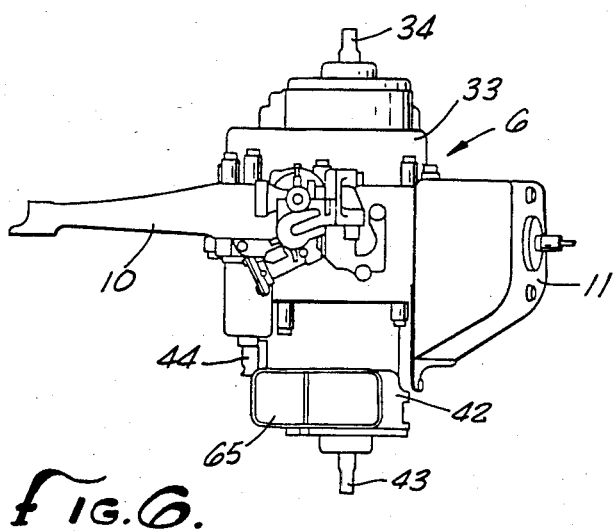
FIG. 6 is a plan view of the power unit of FIG. 5.
Figure 7:
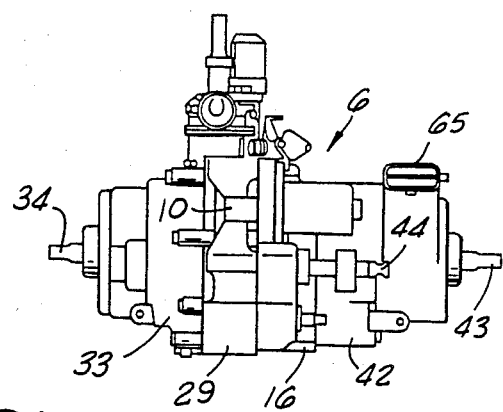
FIG. 7 is a front view of the power unit of FIG. 5.

Turning in detail to the drawings, a three-wheel, articulated vehicle is illustrated as including a front handlebar and steering assembly 1, a front wheel 2, a step floor 3 and a seat 4. These components all form part of a front body portion, generally designated 5. The front body portion generally exhibits the appearance of a normal scooter configuration.

Aft of the front body portion 5 is a power unit 6, a left rear wheel 7 which is freewheeling and a right, driven rear wheel 7'. The power unit and rear wheels define a rear body portion, generally designated 8. The two body portions 5 and 8 are joined at a swing joint mechanism 9. The swing joint mechanism 9 includes a housing 9a and a joint shaft 9b. The housing is affixed to the rear body portion 8 while the shaft is affixed to the front body portion 5. The mechanism 9 allows the front body portion 5 to lean or roll in cornering to provide a ride similar to that of a conventional scooter. Meanwhile, the two rear wheels remain on the ground without body roll.

Figure 8:
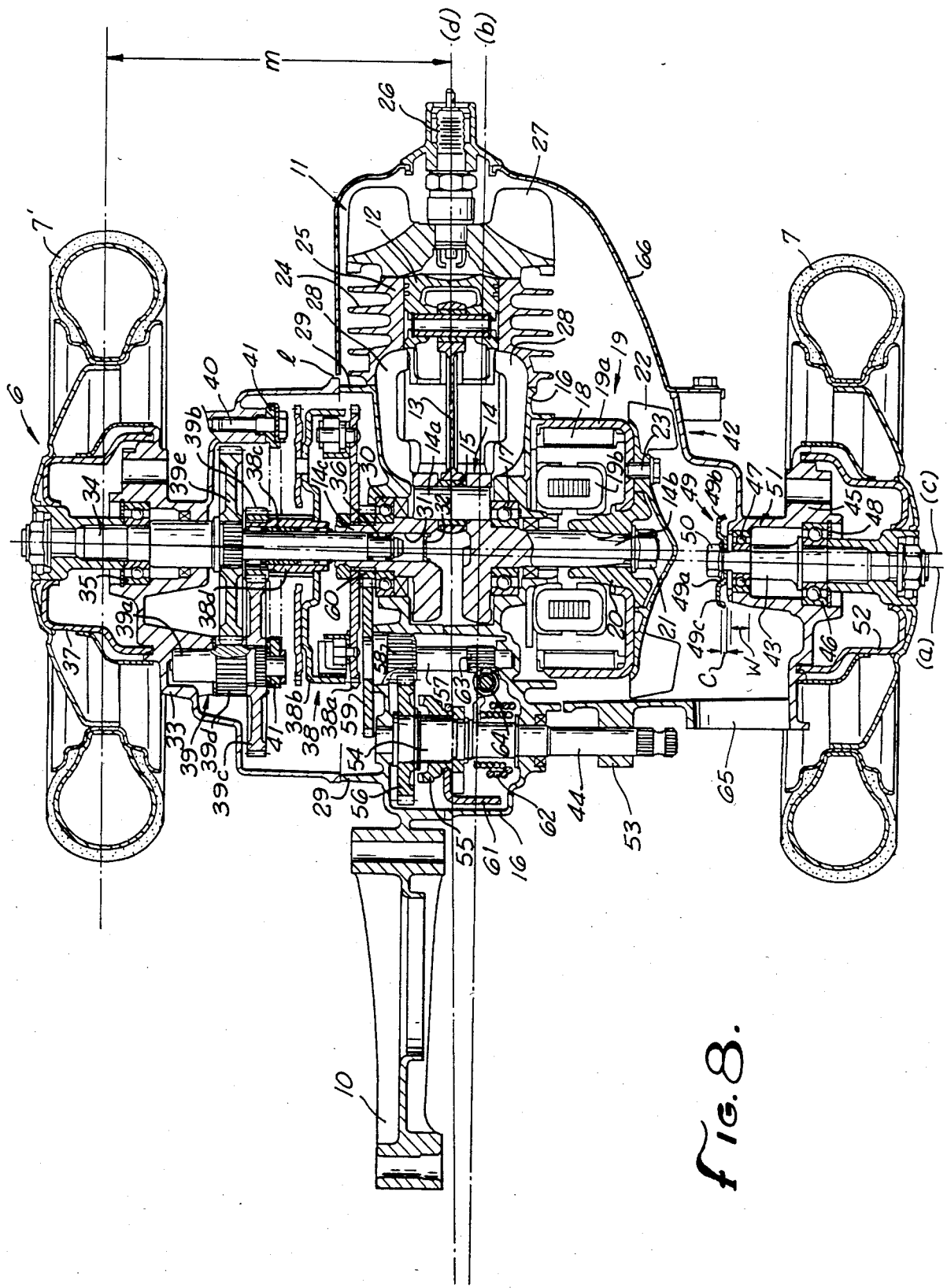
FIG. 8 is a cross-sectional plan view of a power unit and final drive of the present invention.

Looking then in greater detail to the power unit 6 as illustrated in FIGS. 5–8, a connecting arm 10 extends forwardly from the unit for connection with the outer case 9a of the swing joint mechanism 9. A single cylinder engine 11 provides the source of power for the power unit. The engine 11 includes a piston 12 coupled by a connecting rod 13 to a crankshaft, generally designated 14. The crankshaft 14, as best illustrated in FIG. 8, includes a central crankpin 14a associated with the connecting rod 13 through a bearing 15. Supporting the crankpin 14a is a left shaft 14b and a right shaft 14c.

The engine housing is divided into several parts including an engine crankcase and crankcase covers. The engine crankcase is itself divided and includes a left crankcase section 16. The left crankcase section 16 provides support for a bearing 17 which in turn supports the left shaft 14b of the crankshaft 14. The left crankcase section 16 also supports a generator, generally designated 19, which includes magnets 18 on a generator outer 19a surrounding a generator coil 19b. The coil 19b is affixed to the left crankcase section 16. The generator outer 19a is caused to rotate with the left shaft 14b by mounting the generator through a boss 20 onto the shaft, retained by a nut 21.

Mounted to the outside of the generator 19 so as to rotate therewith is a fan 22. The fan 22 is bolted to the generator outer 19a by means of bolts 23. The fan is thus able to rotate with the crankshaft 14 with increased engine speed resulting in increased air flow. The air flow from the fan 22 also passes across heat transfer fins 24 of the cylinder body 25. Fins are also provided on the cylinder head 27 for additional cooling. An ignition plug 26 is positioned within the cylinder head 27.

In the event that the engine 11 is of a two-stroke design, transfer passages 28 may also be defined in the cylinder body 25 and the crankcase.

The crankcase further comprises a right crankcase section 29 securely associated with the left crankcase section 16. The right crankcase section 29 provides support for a bearing 30 which in turn supports the right shaft 14c of the crankshaft 14.

The right shaft 14c includes a coaxial bore 31. This bore conveniently extends through the right shaft 14c but is blocked by means of a seal 32 to prevent the gases within the crankcase from moving outwardly into the lubricant and bearings. The coaxial bore opens toward a right crankcase cover 33 also forming part of the engine housing and being rigidly affixed with the right crankcase section 29.

Located within the right crankcase cover 33 is a drive shaft 34. The right rear wheel 7' is associated with the drive shaft 34 so as to be driven by it. The drive shaft 34 is rotatably mounted in the right crankcase cover 33 by means of a bearing 35. The bearing 35 is out near the plane of the wheel 7' so as to provide maximum support. The inner end of the drive shaft 34 extends into the coaxial bore 31 of the right shaft 14c. Needle bearings 36 rotatably mount the drive shaft 34 in the crankshaft 14. The drive shaft 34 is aligned with the centerline of the crankshaft 14 in this arrangement. Also affixed at the outer end of the drive shaft 34 is a brake drum 37 providing conventional braking capability.

Fixed to the right shaft 14c of the crankshaft 14 is one side of a clutch mechanism, generally designated 38. This first side of the clutch mechanism 38 includes a clutch plate 38a. A centrifugal clutch mechanism is illustrated with the centrifugal components located on the clutch plate 38a. Rotatably mounted about the drive shaft 34 is the other side of the clutch or clutch outer 38b. The clutch outer 38b is free to rotate relative to the drive shaft 34 and is coaxially mounted thereon for convenience. Needle bearings 38c provide the appropriate bearing mechanism between the clutch outer 38b and the drive shaft 34.

Coupled with the clutch mechanism to operably couple the clutch with the drive shaft is a gear train, generally designated 39. The gear train 39 includes a countershaft 39a mounted at one end to the right crankcase cover 33. Mounted about the hub 38d associated with the clutch outer 38b is a first gear wheel 39b. Additional gear wheels 39c, 39d and 39e engage in series to direct power from the clutch mechanism 38 to the drive shaft 34. To further support the gear mechanism, bolts 40 hold a plate 41 in position to support the second end of the countershaft 39a.

Associated with the crankcase on the other side of the engine from the right crankcase cover 33 is a left crankcase cover 42. The left crankcase cover 42 extends to surround the fan 22 to form a fan cover. The cover 42 also extends outwardly to form a journal support 45 for a free-wheeling axle shaft 43. Also supported in the left crankcase cover 42 is a kickshaft 44. The axle shaft 43 is supported in bearings 46 and 47. The bearing 46 is held in place by a snap ring 48. A labyrinth plate, generally designated 49, is fixed to the inner end of the shaft 43 by means of a bolt 50. The labyrinth plate 49 includes a hub 49a, an outer edge 49b and a concave annular web 49c. The device is arranged such that the space between the concave web 49c and the wall of the bearing support (C) is less than the width (W) of the bearing 47 contained within the bore 51.

The axle shaft 43 is shown to be aligned with a central axis (a) which is perpendicular to the centerline of the vehicle (b). Thus, the wheel 7 mounted to the axle shaft 43 along with the brake drum 52 is aligned without toe-in parallel to the longitudinal axis of the vehicle. Because power is directed through only one of the rear wheels to create an asymmetric driving force, the drive shaft 34 is canted forward to create toe-in on the wheel 7'. The axis (c) of the drive shaft 34 is canted forward as can be seen in FIG. 8. To accommodate this toe-in, the crankshaft 14 is also at an angle such that it is aligned with the drive shaft 34. The cylinder 25 of the engine 11 is also arranged such that the centerline (d) is perpendicular to the axis of the crankshaft 14. Thus, the vehicle will be driven straight along its centerline in spite of the drive offset.

The left crankcase cover 42 includes a bracket 53 for support of the kickshaft 44. The kickshaft 44 extends through the crankcase portion 16 to a screw mechanism 54 mounting a jump gear 55 when the jump gear 55 is engaged with the gear 56 during starting, the countershaft 57 through gear 58 is engaged. Through gear 59, gear 60 on the crankshaft 14 is driven for starting of the engine. A return spring 61 provides disengagement for the gear 55 while return spring 62 again cocks the kickshaft 44. During engine running, the countershaft 57 drives a worm gear through wheel 63 and worm 64 for driving an oil pump (not shown).

The left crankcase cover 42 provides a shroud for the fan 22 as mentioned above. An inlet 65 to the crankcase cover provides air flow to the fan. A shroud 66 covers the engine 11 to insure appropriate air flow past the cylinder body 25 and head 27. Air may then exhaust through the space (1) for cooling the generator and engine cylinder.

In operation, the power unit is started by stepping on the kick peddle to drive the kickshaft 44. The crankshaft 14 is rotated through the gears 56, 58 and 59 to start the engine. The engine then drives through the crankshaft 14 to the clutch mechanism. When sufficient centrifugal force is generated within the clutch, power is transferred to the gear train 39 and in turn to the drive shaft 34. As the wheel 7' urges the vehicle forward, freewheeling wheel 7 follows. The toe-in of the wheel 7' accommodates the asymmetric load to move the vehicle forward without bias.

Through the association of components with particular attention to the crankshaft 14 with the drive shaft 34 supported by the crankshaft, the power unit is reduced in size and weight. The offset (m) between the cylinder and the drive wheel is reduced to narrow the tread. Thus, the reductions in weight, complexity and size make possible a three-wheel vehicle which closely approaches the utility and performance of a two-wheel vehicle. Additionally, the advantages of a three-wheel vehicle are realized.

Other advantages of the power train of the present invention are also realized. Assembly of a vehicle employing such a power unit is facilitated with easy insertion of the drive shaft 34 and attachment of the right crankcase cover after coupling part of the clutch and the gear train. The compactness of the device also allows its use with a two-wheel vehicle such as a motor scooter with the center of gravity near the body centerline. Naturally, a four-wheel vehicle may also be advantaged by the compact design.

Thus, a compact power unit of particular advantage for three-wheel vehicles having articulated frames is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A power unit for a vehicle, comprising an engine housing;
   a crankshaft rotatably mounted in said engine housing and having a coaxial bore in a first end thereof; and
   a drive shaft, a first end of said drive shaft being rotatably mounted to said engine housing and a second end of said drive shaft being rotatably mounted in said coaxial bore of said crankshaft, said drive shaft having a driven connection with said crankshaft.

2. A power unit for a vehicle, comprising an engine housing;
   a crankshaft rotatably mounted in said engine housing and having a coaxial bore in a first end thereof;
   a drive shaft, a first end of said drive shaft being rotatably mounted to said engine housing and a second end of said drive shaft being rotatably mounted in said coaxial bore of said crankshaft, said drive shaft having a driven connection with said crankshaft;
   an axle shaft mounted in said engine housing on the opposite side of said engine housing from said drive shaft, said axle shaft being perpendicular to the centerline of the vehicle and said drive shaft being canted forward from perpendicular to the centerline of the vehicle.

3. A power unit for a vehicle, comprising an engine housing;
   a crankshaft rotatably mounted in said engine housing and having a coaxial bore in a first end thereof;
   a drive shaft, a first end of said drive shaft being rotatably mounted to said engine housing and a second end of said drive shaft being rotatably mounted in said coaxial bore of said crankshaft, and
   a clutch coaxially arranged with said crankshaft and said drive shaft, one side of said clutch being fixed to rotate with said crankshaft.

4. The power unit of claim 1 wherein said engine housing includes a crankcase, said crankshaft being rotatably mounted in said crankcase and a first crankcase cover fixed to a first side of said crankcase, said first end of said drive shaft being rotatably mounted in said first crankcase cover.

5. The power unit of claim 4 further comprising a freewheeling axle shaft, said engine housing further includes a second crankcase cover, said second crankcase cover being fixed on a second, opposite side of said crankcase from said first side and mounting said freewheeling axle shaft.

6. The power unit of claim 2 further comprising an engine having a cylinder, the axis of said cylinder being perpendicular to the axis of said drive shaft.

7. A power unit for a vehicle, comprising an engine housing;
   a crankshaft rotatably mounted in said engine housing and having a coaxial bore in a first end thereof;
   a drive shaft, a first end of said drive shaft being rotatably mounted to said engine housing and a second end of said drive shaft being rotatably mounted in said coaxial bore of said crankshaft,
   a clutch coaxially arranged with said crankshaft and said drive shaft, one side of said clutch being fixed to rotate with said crankshaft, and
   a gear train operably coupled between the other side of said clutch and said drive shaft.

* * * * *